United States Patent
Bowers et al.

(10) Patent No.: US 8,425,033 B2
(45) Date of Patent: *Apr. 23, 2013

(54) TINTED CONTACT LENSES WITH CRESCENT PATTERNS

(75) Inventors: Angie L. Bowers, Jacksonville, FL (US); Jerry W. Dukes, Sterlington, LA (US)

(73) Assignee: Johnson & Johnson Vision Care, Inc., Jacksonville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,875

(22) Filed: Sep. 30, 2011

(65) Prior Publication Data

US 2012/0019772 A1    Jan. 26, 2012

Related U.S. Application Data

(62) Division of application No. 12/166,465, filed on Jul. 2, 2008, now Pat. No. 8,066,370.

(51) Int. Cl.
*G02C 7/04* (2006.01)

(52) U.S. Cl.
USPC .................................. 351/159.28; 351/159.31

(58) Field of Classification Search ... 351/160 R–160 H, 351/159.24, 159.28, 159.31; D16/101, 130
See application file for complete search history.

(56) References Cited

U.S. PATENT DOCUMENTS

| | | |
|---|---|---|
| 3,339,997 A | 9/1967 | Wesley |
| 4,525,044 A | 6/1985 | Bauman |
| 4,582,402 A | 4/1986 | Knapp |
| 4,733,959 A | 3/1988 | Claussen et al. |
| 4,889,421 A | 12/1989 | Cohen |
| 5,057,578 A | 10/1991 | Spinelli |
| 5,059,018 A | 10/1991 | Kanome et al. |
| 5,314,960 A | 5/1994 | Spinelli et al. |
| 5,371,147 A | 12/1994 | Spinelli et al. |
| 5,617,154 A | 4/1997 | Hoffman |
| 5,757,458 A | 5/1998 | Miller et al. |
| D413,342 S | 8/1999 | Jahnke |
| 5,963,298 A | 10/1999 | Bard |
| 6,196,683 B1 | 3/2001 | Quinn et al. |
| 6,733,127 B2 | 5/2004 | Bensky |
| 8,066,370 B2 | 11/2011 | Bowers et al. |
| 2002/0080327 A1 | 6/2002 | Clark et al. |
| 2003/0117576 A1 | 6/2003 | Thakrar et al. |
| 2003/0227596 A1 | 12/2003 | Clark et al. |

FOREIGN PATENT DOCUMENTS

| | | |
|---|---|---|
| EP | 1376204 A1 | 1/2004 |
| GB | 1340877 A | 12/1973 |
| WO | 98/44380 A1 | 10/1998 |
| WO | 9844380 | 10/1998 |
| WO | WO 03104878 A1 | 12/2003 |
| WO | 2006/023664 A1 | 3/2006 |
| WO | WO 2008067143 A2 | 6/2008 |
| WO | WO 2008067143 A3 | 10/2008 |

OTHER PUBLICATIONS

PCT International Search Report for PCT US2009049259 Date of Mailing Feb. 24, 2010.

*Primary Examiner* — Darryl J Collins

(57) ABSTRACT

The invention provides tinted contact lenses that use a crescent-shaped pattern or pattern element to enhance the lens wearer's iris.

16 Claims, 9 Drawing Sheets

TINTED CONTACT LENSES WITH CRESCENT PATTERNS

CROSS REFERENCE TO RELATED APPLICATION

This application is a divisional application of U.S. Pat. application Ser. No. 12/166,465 filed Jul. 2, 2008 now U.S. Pat. No. 8,066,370, hereby incorporated by reference, to which this application claims priority under 35 U.S.C. §121

FIELD OF THE INVENTION

The invention relates to tinted contact lenses. In particular, the invention provides contact lenses that enhance the color of a lens wearer's iris.

BACKGROUND OF THE INVENTION

The use of tinted, or colored, contact lenses to alter the natural color of the iris is well known. Typically, these lenses use either or both opaque and translucent colors to change the color of an iris, as for example, from brown to blue. Additionally, tinted lenses have been manufactured that attempt to enhance the iris color without changing the color. These lenses are disadvantageous because either the color enhancement is too subtle to be noticed when the lens is on-eye or the enhancement lends an unnatural appearance to the wearer's iris.

DETAILED DESCRIPTION OF THE INVENTION AND PREFERRED EMBODIMENTS

The invention provides tinted contact lenses, and methods for their manufacture, that use a crescent-shaped pattern or pattern element to enhance the lens wearer's iris. Additionally, the lenses of the invention may have additional pattern elements that completely or partially overlie the wearer's iris. The lenses of the invention may find greatest utility as cosmetic lenses for enhancing a dark-eyed individual's iris, but also may be used to enhance the iris of a light-eyed lens wearer as well.

In one embodiment, the invention provides a contact lens comprising, consisting essentially of, and consisting of a crescent-shaped pattern. In another embodiment, the invention provides a contact lens comprising, consisting essentially of, and consisting of at least one crescent-shaped pattern element.

By "crescent-shaped pattern" is meant a pattern having one or more elements, the overall shape of the pattern substantially forming a crescent. By "crescent-shaped pattern element" is meant a portion of a pattern the overall shape of which element substantially forms a crescent.

In the lenses of the invention, the crescent-shaped pattern or crescent-shaped pattern element preferably is located completely or partially in the iris portion of the lens. By "iris portion" is meant that part of the lens that substantially overlies the lens wearer's iris when the lens is on-eye and centered.

Figure 1:
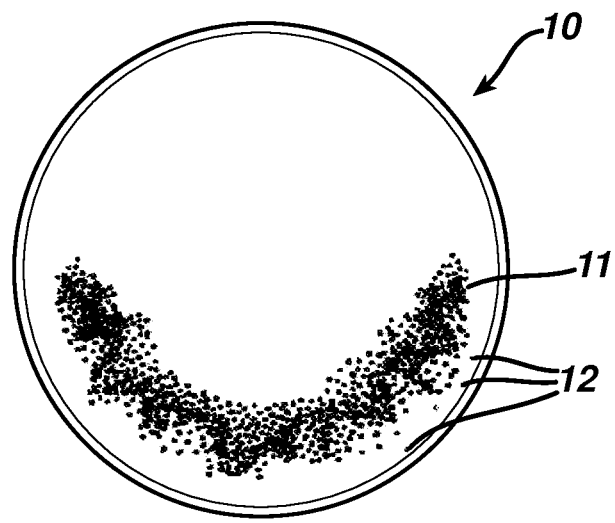
FIG. 1 is one embodiment of the invention.

In FIG. 1 is shown one embodiment of the invention, which is crescent-shaped pattern 1 1 on lens 10. In this embodiment, the crescent-shaped pattern 1 1 is located at the bottom of the iris portion of the lens. For purposes of the invention, by the lens' top is meant that portion centered at or about the 90' location on the lens when the lens is on-eye and properly oriented and the bottom is centered at about the 270' location on the lens. One ordinarily skilled in art will recognize that the pattern may be placed at any position on the lens at which a enhancing or highlighting of the lens wearer's iris is desired.

The precise dimensions of the crescent-shaped pattern and crescent-shaped pattern element will depend upon the extent of the enhancing effect desired.

Typically, from one end of the pattern or element to the other, as one moves circumferentially around the lens, the length will be about 6 to about 13.5 mm, preferably about 9 to 9.6 mm, and the width will be of about 0.75 to about 5 mm, preferably about 0.8 to about 2 mm. The innermost border of the pattern, meaning the border closest to the geometric center of the lens will be about 2 to about 6 mm and preferably about 3 to about 3.5 mm from the center. The outermost border of the pattern will be about 4 to about 8 mm from the geometric center of the lens. The total area of coverage of the pattern crescent-shaped pattern or all of the crescent-shaped pattern elements preferably is no greater than 75% of the iris portion of the lens.

As shown in FIG. 1, the individual elements of the crescent-shaped pattern are dots 12. However, the elements composing the crescent-shaped patterns and the crescent-shaped pattern elements of the invention may be any of a wide variety of elements. Suitable elements include, without limitation, geometric elements including, without limitation lines, fanciful structures including, without limitation, striae, featherlike shapes, and the like, and combinations thereof. Preferably, the elements are dots about 0.01 to about 0.3 mm in diameter, more preferably about 0.05 to about 0.175 mm in diameter. The elements may be uniformly or randomly spaced part within the pattern.

Figure 2:
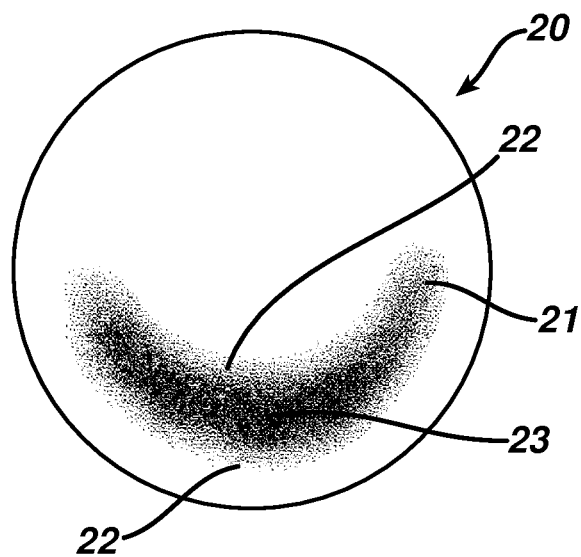
FIG. 2 is a second embodiment of the invention.

In FIG. 2 is shown a second embodiment of the invention, which is crescent-shaped pattern 21 on lens 20. In this embodiment, the crescent-shaped pattern 21 is a gradient pattern located at the bottom of the iris portion of the lens. By "gradient pattern" is meant that the pattern increases or decreases in opacity of color as one moves from one area to another area of the pattern. As shown in FIG. 2, the pattern increases in opacity as one moves from the periphery 22 of the pattern to the center 23. Alternatively, the gradient may be such that opacity decreases as one moves from the periphery to the center of the crescent-shaped pattern.

Figure 3A:
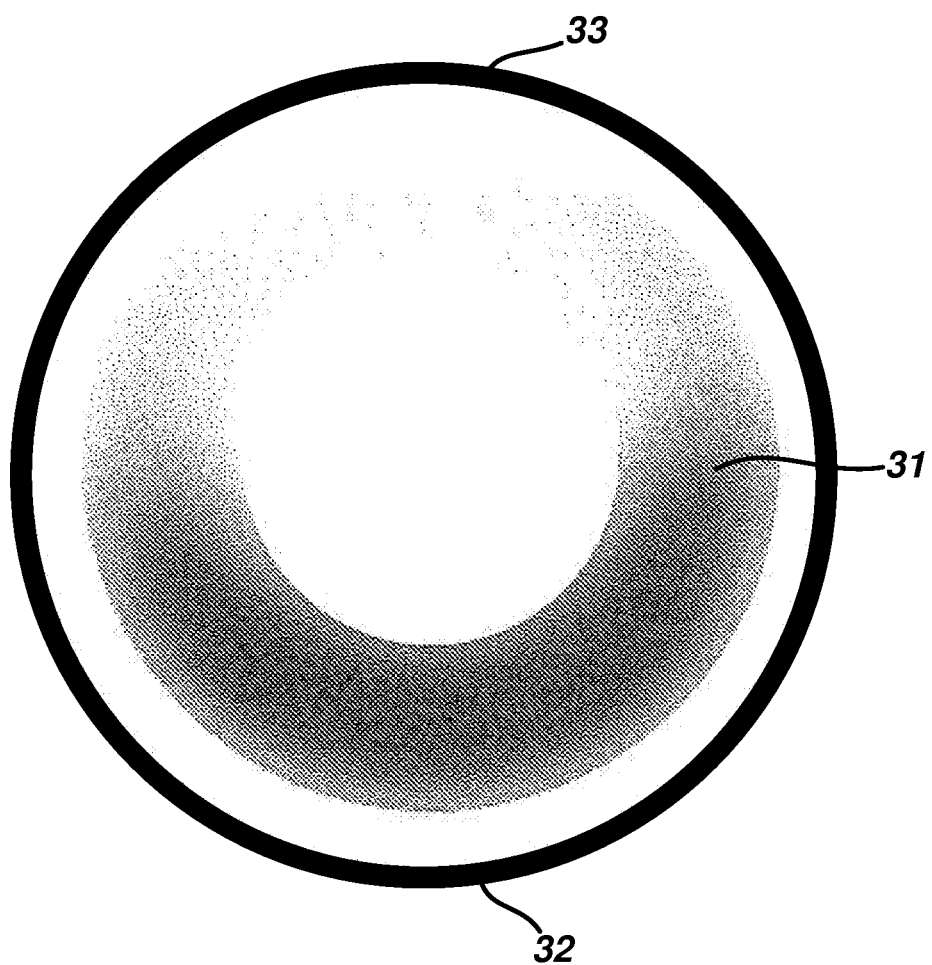
FIGS. 3a, 3b, and 3c are variations of a third embodiment of the invention.
Figure 3B:
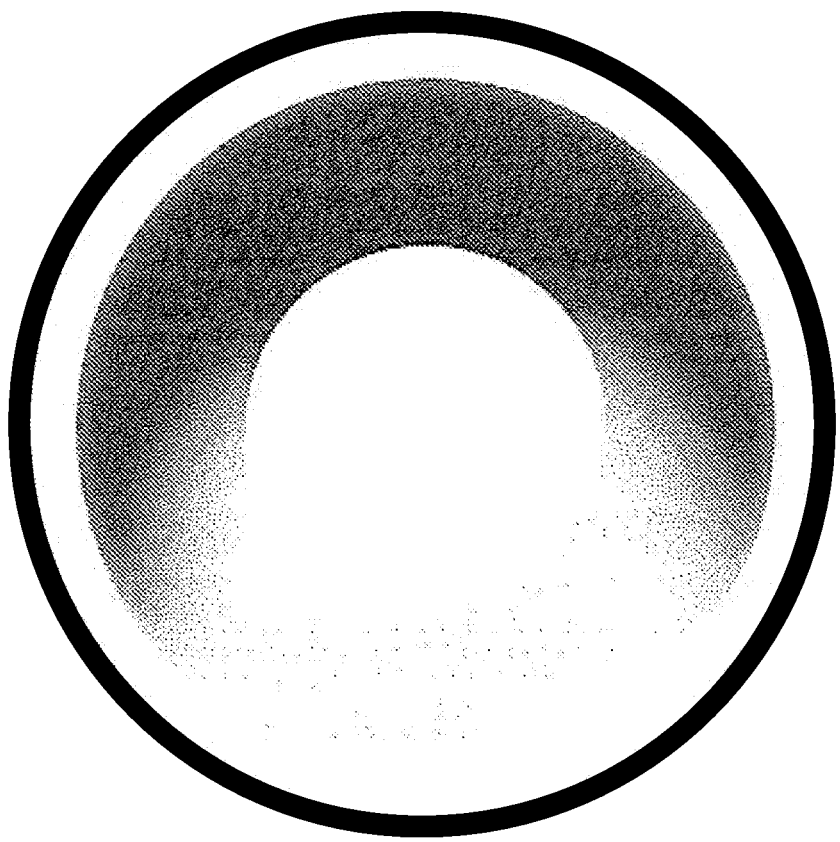
Figure 3C:
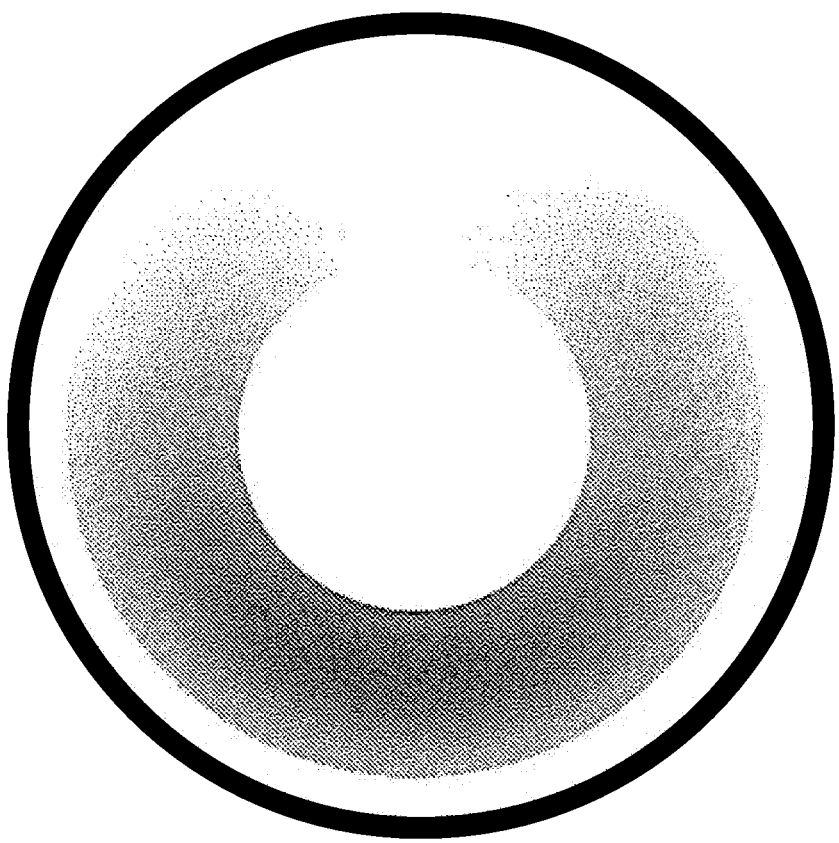

In FIG. 3a is shown yet another alternative in which crescent-shaped pattern 31 composes a majority of the area of the iris portion of the lens. The opacity of the pattern decreases as one moves from the portion of the pattern located at the bottom 32 of the lens towards that located at the top 33 of the lens. FIG. 3b depicts a pattern inverse to that shown in FIG. 2 and FIG. 3c shows yet another alternative pattern.

Figure 4A:
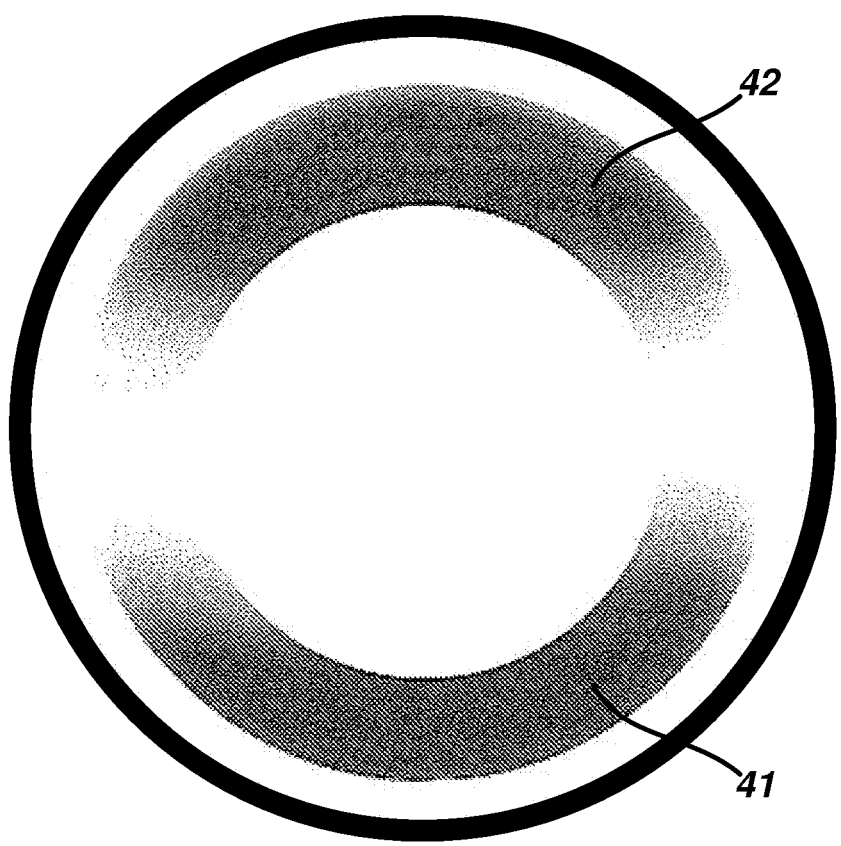
FIGS. 4a, 4b, and 4c are variations of a fourth embodiment of the invention.
Figure 4B:
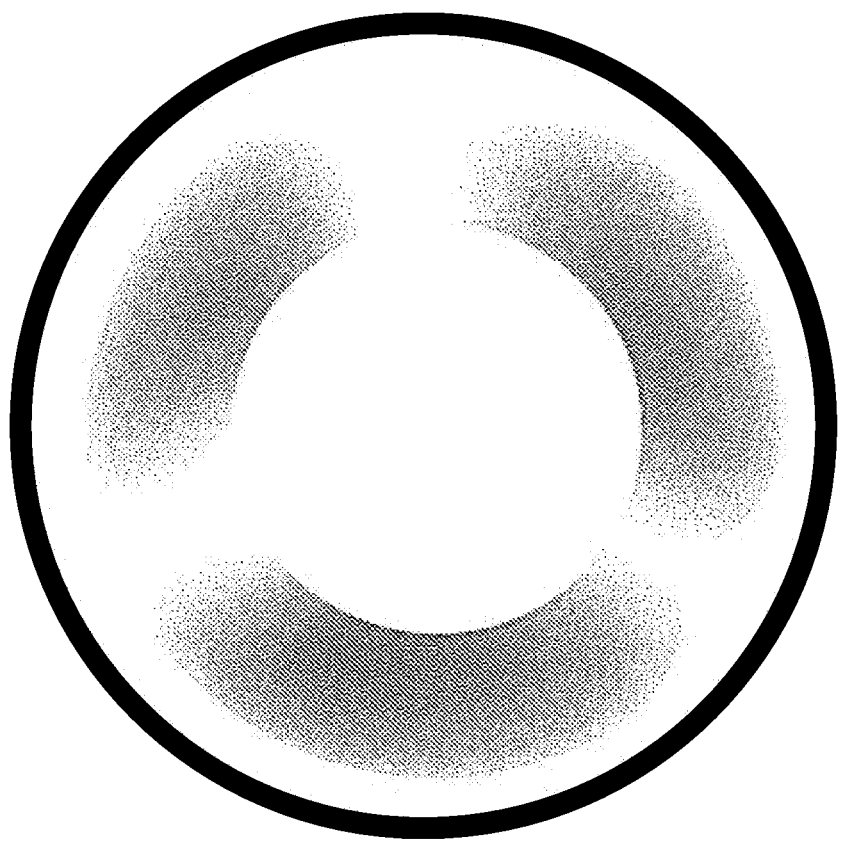
Figure 4C:
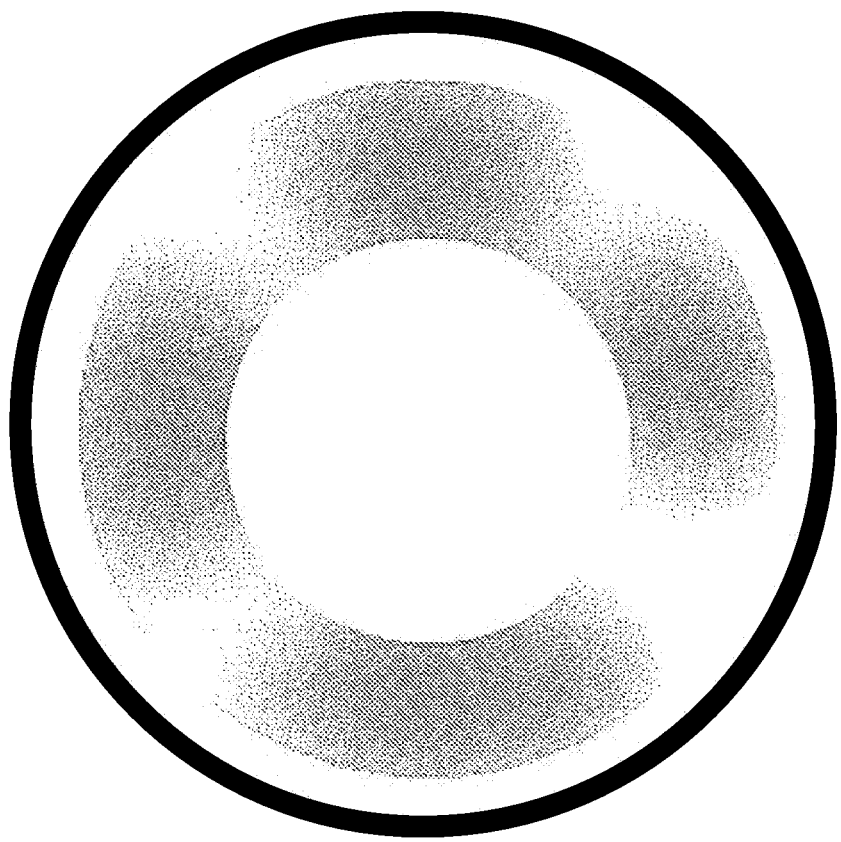

A pattern in which more than one crescent-shaped element is used is depicted in FIG. 4a. The pattern of this figure is composed of a first crescent-shaped pattern element 41 and a second crescent-shaped pattern element 42. Both of the crescent-shaped pattern elements also have a gradient that increase in opacity as one moves from the center of the pattern circumferentially upwardly. Additional examples of multiple crescent-shaped patterns elements are shown in FIGS. 4b and 4c.

Figure 5A:
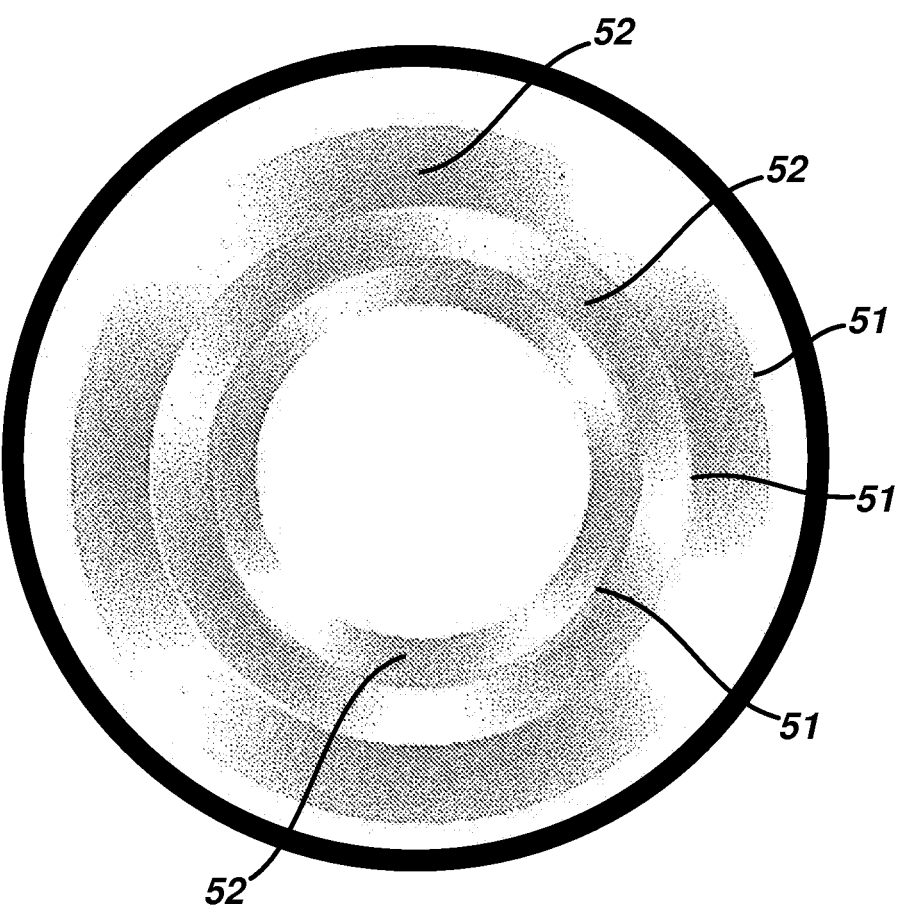
FIGS. 5a and 5b are variations of a fifth embodiment of the invention.
Figure 5B:
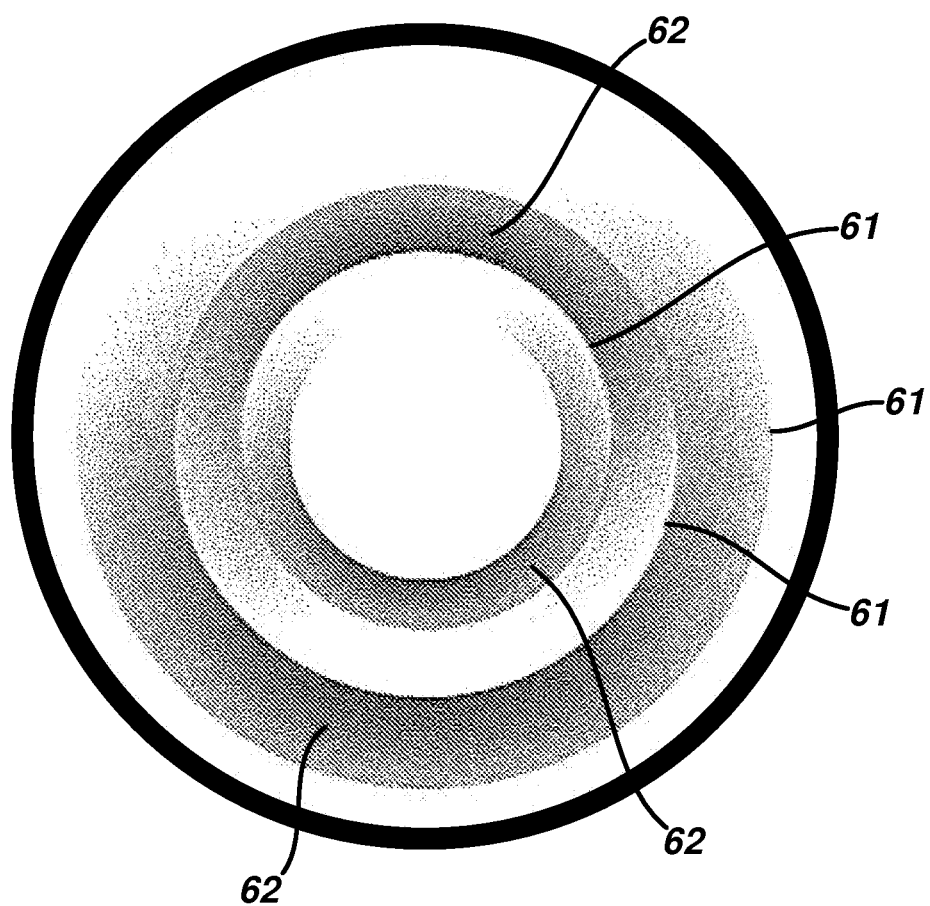

The crescent-shaped pattern elements also may be used in two or more concentric rings. For example and as shown in FIG. 5a, multiple rings 51 each of which incorporates multiple crescent-shaped elements 52 are shown. Alternatively and as shown in FIG. 5b, multiple rings 61 each composed of one crescent-shaped pattern 62 may be used. In embodiments in which multiple rings are used, each of the rings may be of any suitable width and preferably are about 0.1 to about 2.00 mm in width. Any number of rings may be used and preferably about 3 to about 6 rings are used. In the design of the invention, the innermost border 17 of the rings may be from about 4 to about 8 mm, preferably about 6.5 to about 8 mm from the lens' geometric center.

In the lenses of the invention, the pupil portion, meaning the portion of the lens overlying the wearer' pupil when the lens is on-eye preferably is clear. However, the pupil portion may be an area of translucent or opaque color or any combination of opaque and translucent colors.

The crescent-shaped pattern and the crescent-shaped pattern elements may be used alone or in combination with other elements. For example, elements including, without limitation, circles, ovals, triangles, lines, striae, feather-like shapes, and the like, and combinations thereof may used within, outside of, or overlying the crescent shaped pattern or element. The additional elements may be translucent or opaque color or any combination of opaque and translucent colors.

The crescent-shaped patterns and crescent-shaped pattern elements of the invention may be translucent or opaque depending on the desired on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T. The color will be determined by the natural color of the lens wearer's iris and the enhancement desired. Thus, elements may be any color including, without limitation, any of a variety of hues and chromas of blue, green, gray, brown, black yellow, red, or combinations thereof. Preferred colors include, without limitation, any of the various hues and chromas of silver, grey, gold, yellow, and orange.

The elements of the patterns of the invention may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available.

The dye or pigment selected may be combined with one or more of a pre-polymer, or binding polymer, and a solvent to form the colorant used to produce the translucent and opaque layers used in the lenses of the invention. Other additives useful in contact lens colorants also may be used. The binding polymers, solvents, and other additives useful in the color layers of the invention are known and either commercially available or methods for their making are known.

The pattern and pattern elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The pattern and elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. For embodiment, such as shown in FIG. 2, in which the rings blend into one another, preferably the blending is achieved by using a laser to produce the pattern in the metal plate, which laser is capable of etching complex slopes into the plate. Lasers suitable for such uses are commercially available. A colorant containing a binding polymer, solvent, and pigment or dye is then deposited onto the elements to fill the depressions with colorant. A silicon pad of a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. The mold is degassed for up to 12 hours to remove excess solvents and oxygen after which the mold is filled with lens material. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays at least the limbal ring and dot patterns and preferably forms the entirety of the lens' outermost surface. The pre-polymer may be any polymer that is capable of dispersing the pigment and any opacifying agent used.

The invention may be used to provide tinted hard or soft contact lenses made of any known lens-forming material, or material suitable for manufacturing such lenses. Preferably, the lenses of the invention are soft contact lenses the material selected for forming the lenses of the invention being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens material contains a siloxane functionality, including, without limitation, polydimethyl siloxane macromers, methacryloxypropyl polyalkyl siloxanes, and mixtures thereof, a silicone hydrogel or a hydrogel, made of monomers containing hydroxy groups, carboxyl groups, or combinations thereof. Materials for making soft contact lenses are well known and commercially available. Preferably, the material is acquafilcon, etafilcon, genfilcon, lenefilcon, balafilcon, lotrafilcon, or galyfilcon.

What is claimed is:

1. A contact lens, comprising a natural appearance enhancing crescent-shaped pattern that overlies less than half of the area of the iris portion of the lens and one or more additional patterns that are not crescent shaped.

2. The contact lens of claim 1 wherein said additional pattern is selected from the group consisting of circles, ovals, triangles, lines, striae, and feather-like shapes.

3. The contact lens of claim 1 wherein the additional patterns lie within the crescent-shaped pattern.

4. The contact lens of claim 1 wherein the additional patterns lie outside of the crescent-shaped pattern.

5. The contact lens of claim 1 wherein the additional patterns overlie the crescent-shaped pattern.

6. The contact lens of claim 1 wherein said additional patterns are translucent.

7. The contact lens of claim 1 wherein said additional patterns are opaque.

8. The contact lens of claim 1 wherein said additional patterns are colored.

9. A method of enhancing a lens wearer's eye, comprising providing a contact lens comprising a natural appearance enhancing crescent-shaped pattern that overlies less than half of the area of the iris portion of the lens and one or more additional patterns that are not crescent shaped.

10. The method of claim 9 wherein said additional pattern is selected from the group consisting of circles, ovals, triangles, lines, striae, and feather-like shapes.

11. The method of claim 9 wherein the additional patterns lie within the crescent-shaped pattern.

12. The method of claim 9 wherein the additional patterns lie outside of the crescent-shaped pattern.

13. The method of claim 9 wherein the additional patterns overlie the crescent-shaped pattern.

14. The method of claim 9 wherein said additional patterns are translucent.

15. The method of claim 9 wherein said additional patterns are opaque.

16. The contact lens of claim 9 wherein said additional patterns are colored.

* * * * *